350-471 SR

OR 3,018,689

SEARCH RO

Jan. 30, 1962 D. M. SAXE 3,018,689

OPTICAL SYSTEM FOR ELECTRO-OPTICAL SWITCHING APPARATUS

Filed May 28, 1959 2 Sheets-Sheet 1

INVENTOR.
DOUGLAS M. SAXE
BY Frank C. Parker
ATTORNEY

Jan. 30, 1962 D. M. SAXE 3,018,689

OPTICAL SYSTEM FOR ELECTRO-OPTICAL SWITCHING APPARATUS

Filed May 28, 1959 2 Sheets-Sheet 2

| E.F.=100 f/8.0 ACHROMATIZED FOR 4047Å RADIATION | | | | | |
|---|---|---|---|---|---|
| LENS | | | | $n_D$ | ν |
| A | $R_1$ = +21.579<br>$R_2$ = −95.948 | $t_1$ = 5.61 | | 1.6170 | 54.9 |
| B | $R_2$ = −95.948<br>$R_3$ = +16.369 | $t_2$ = 1.87 | $S_1$ = 1.40 | 1.5585 | 45.5 |
| C | $R_4$ = +22.389<br>$R_5$ = +31.771 | $t_3$ = 2.34 | $S_2$ = 5.02 | 1.5585 | 45.5 |
| D | $R_6$ = −47.647<br>$R_7$ = −28.976 | $t_4$ = 3.46 | $S_3$ = 1.40 | 1.5585 | 45.5 |
| E | $R_8$ = −18.968<br>$R_9$ = +92.474 | $t_5$ = 1.96 | | 1.5585 | 45.5 |
| F | $R_9$ = +92.474<br>$R_{10}$ = −25.944 | $t_6$ = 5.86 | | 1.6170 | 54.9 |

INVENTOR.
DOUGLAS M. SAXE

BY Frank C. Parker

ATTORNEY

United States Patent Office 3,018,689

Patented Jan. 30, 1962

3,018,689

OPTICAL SYSTEM FOR ELECTRO-OPTICAL SWITCHING APPARATUS

Douglas M. Saxe, Rochester, N.Y., assignor to Bausch & Lomb Incorporated, a corporation of New York Filed May 28, 1959, Ser. No. 816,492
1 Claim. (Cl. 88—57)

Figures 1, 2:
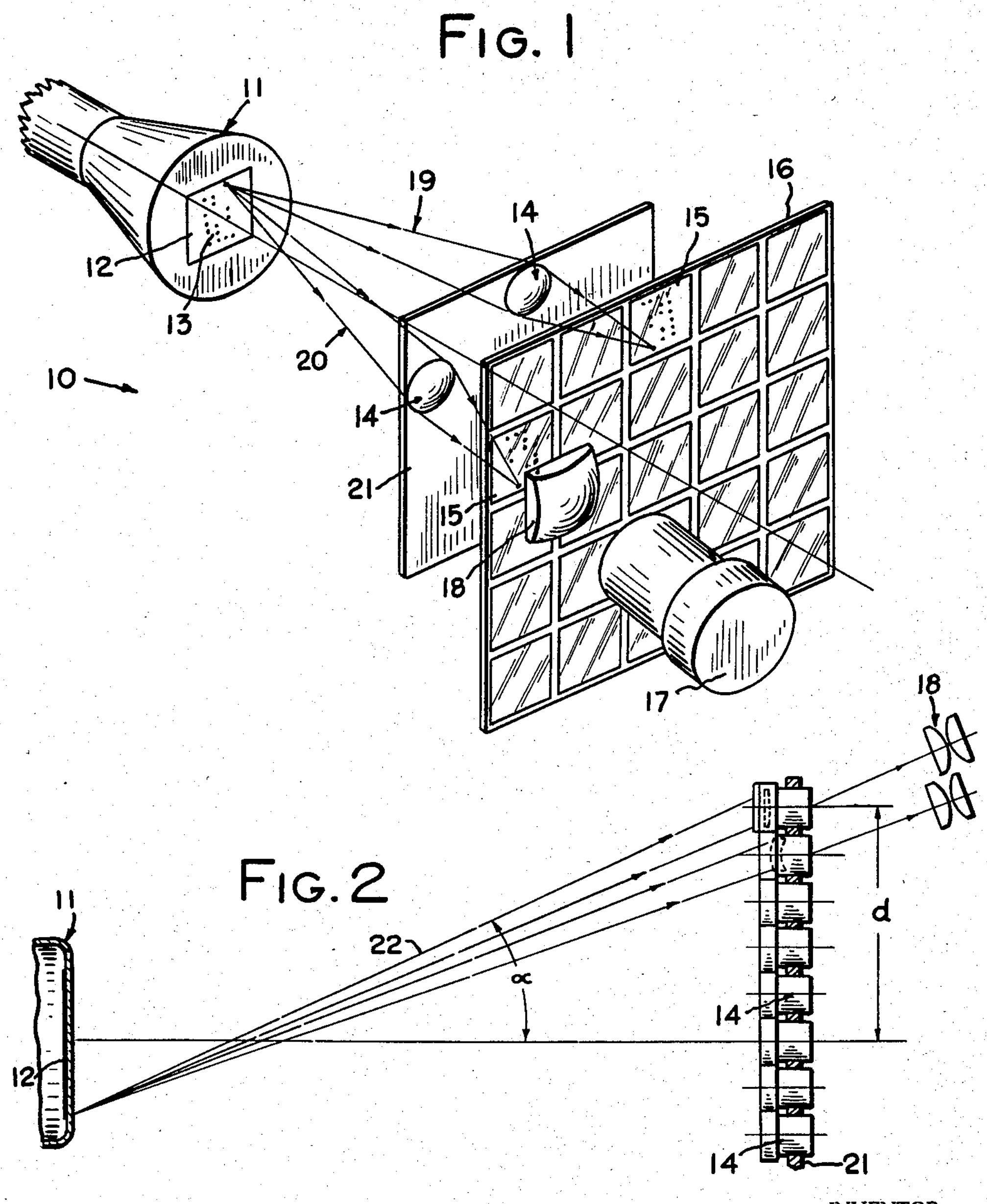

This invention relates generally to electro-optical switching apparatus and the like and more particularly relates to an optical system which forms a part thereof.

Electro-optical switching apparatus of the kind here under consideration comprises primarily a cathode ray tube having a fluorescent material on its screen whereon certain coded information is caused to appear in a pattern of radiant spots on the raster or line structure on the screen. The radiant flux from said spots is transmitted by an optical system which forms a greatly reduced image of said screen and the spot pattern carried thereby upon a glass plate whereon said spot pattern has previously been photographically formed by the same lens system. In preparing said plate, the areas where the spot pattern falls are made clear and transparent to the ultraviolet light of which the image rays are composed, and all other areas of the plate are opaque to said light, so that a mask is effected which passes only the desired spot pattern. For this reason, the plate is commonly called a spot storage plate and it serves as a memory device.

Rearwardly of the spot storage plate, a lens is provided for spreading the spot pattern advantageously over the receiving elements of a photomultiplier tube which is connected in circuit with a network of electrical switching mechanism to control selected circuits in said apparatus.

It is possible potentially to transmit a prodigious number of bits of information by means of the radiant spots, the maximum number of spots depending on the minimum allowable size which will emit radiation at the required energy level to insure reliable operation of the switching apparatus.

The above-described mechanism constitutes only one channel of information and many similar channels may be grouped together in the electro-optical switching apparatus. Each channel has its respective optical system which is focused on the entire screen of the cathode ray tube and has a field which covers the entire screen so as to form an image thereof on one of a multiplicity of coplanar individual spot storage plates, thus increasing many times the amount of information that may be stored.

Numerous features are important in the design of a lens system which is intended for use in such an electro-optical apparatus.

In order to handle as much information as possible, the size of the individual spots on the cathode ray tube screen is chosen as small as practical, such as .015″ or thereabouts. The image of each spot as projected by the optical system upon said plate shall be extremely sharp in outline and uniformly bright over the entire area of each spot, as well as being of equal brightness with all adjacent spots in the raster, otherwise the desired accurate operation of the electrical components of the apparatus may become faulty. Accordingly, the design of the optical system should provide the ultimate in sharp image boundary definition to promote abrupt contrast rather than perfect resolution and no flare or diffraction effects are desirable. Furthermore, since a great multiplicity of information channels are used, the lens system contained therein should be grouped together in parallel arrangement so that the group occupies a large lateral or radial space and this arrangement causes the image rays to enter the outermost optical systems at steep obliquity since all of these systems cover the same field comprising the cathode ray screen. One of the problems encountered with such oblique projection, is the necessity of providing a sufficient depth of focus in the lens system to resolve details in the nearest and furthest points of a field which is inclined to the projection axis. In some installations the required depth of focus can easily amount to 8% of the projection distance of the lens so that it poses a real problem for the lens designer. Because of the above-mentioned oblique projection, the lens system must be particularly well corrected for coma and zonal spherical aberrations and in addition must be corrected for astigmatism and have no vignetting of the field.

Another important requirement of the optical system is the achromatizing of the optical system for ultraviolet light in the region of 3800 A. to 4200 A. In view of the fact that the choice of partial dispersions or $\nu$ values is exceedingly restricted in lens materials which transmit ultraviolet radiation, this requirement is difficult to meet.

It is an object of this invention to provide an optical system for electro-optical switching apparatus which produces a sharp edged image of high contrast and uniformity of each spot of a pattern composed of minute spots or figures appearing on a flat screen.

A further object is to provide such an optical system having good resolution and depth of focus to cover a large field of at least 50 degrees wherein the field may lie considerably obliquely to the optical axis of said system.

Another object is to provide such an optical system wherein astigmatism, coma and zonal spherical aberration are particularly well corrected in addition to total avoidance of vignetting of the field, said system additionally being achromatized for all light radiations in the range from 3800 A. to 4200 A. and particularly well corrected for 4047 A.

Figures 3, 4:
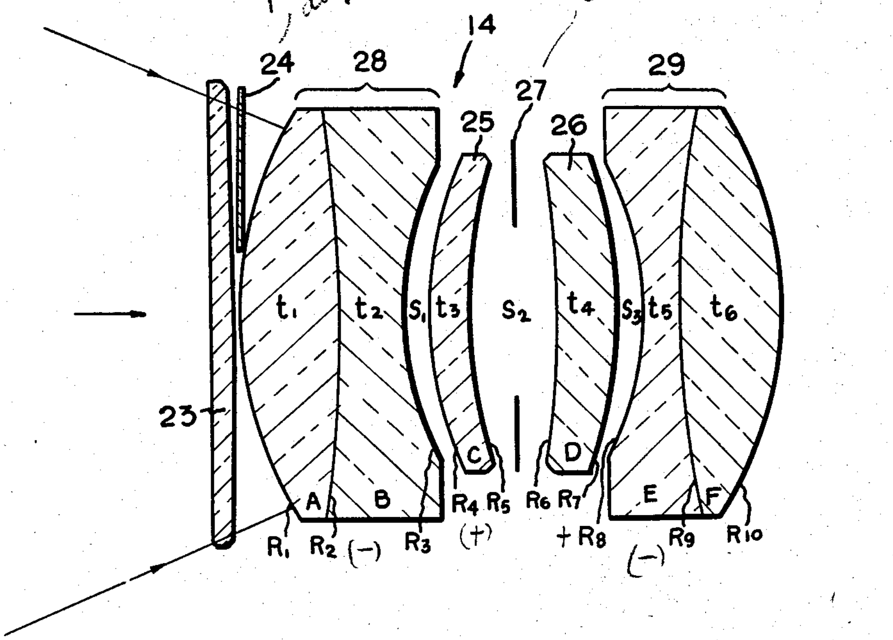

Further objects and advantages will be found in the details of construction and the combination and arrangement of parts by reference to the specification herebelow taken in connection with the accompanying drawings wherein:

FIG. 1 is a disproportionate general schematic view in perspective of an electro-optical switching apparatus in which the present invention is particularly applicable, FIG. 2 is a diagrammatic side view of certain components of said switching apparatus, FIG. 3 is an optical diagram in axial section of the optical system comprising this invention, and FIG. 4 is a chart showing the constructional data used in said optical system.

An electro-optical switching apparatus is shown generally at 10 in FIG. 1 of the drawing, said apparatus comprising a cathode ray tube 11 having a substantially flat screen 12 whereon a raster is formed in the usual manner. In the tube raster a selected coded spot pattern 13 is caused to appear in a known manner and this spot pattern constitutes information which is transmitted through a part of said apparatus by an optical lens system which is generally designated by the numeral 14. A sharply defined image of the spot pattern 13 is formed by the optical system 14 at the plane of a rearwardly spaced flat glass plate 15 which serves as a mask and is commonly called a spot storage plate. This plate is rigidly mounted normal to the axis of the optical system in a suitable frame 16. Said image is formed from rays of ultraviolet radiation, having a wavelength in the range from 3800 A. to 4200 A., emanating from the intensely bright fluorescent spots in the pattern 13.

The plate 15 is photographically prepared in a previous process to incorporate clear transparent areas which register exactly with the elements of the spot pattern 13 and all other areas of the plate are opaquely pigmented. In projecting the spot pattern 13, the screen 12 is considerably reduced in size by a factor of at least 3 or 4 so that the plate 15 may be made conveniently small in dimensions. Beyond the plate or mask 15, the spot pattern 13 is projected rearwardly onto a photomultiplier tube 17 through a divergent lens generally shown at 18, which expands the image of the spot pattern to cover a major portion of the receiving end of the tube. Radiation falling on the tube 17 generates signals which are transmitted electrically through a circuit network in which the tube is connected so as to actuate a remote switching control mechanism which is not shown and is not a part of this invention.

In order to increase the amount of information that can be transmitted by a spot pattern on the cathode ray tube 11, a multiplicity of channels of information, only two of which are represented by numerals 19, 20, respectively, are provided adjacent to each other, each channel comprising an optical system 14 which is focused to cover the entire cathode ray screen 12 and projects an image thereof onto an individual spot storage plate 15 where only the radiant spot pattern is permitted to pass therethrough to a respective photomultiplier tube 17. All of the component optical systems 14 are rigidly held in a mutually parallel arrangement on a lens board 21 positioned parallel to the plane of the screen 12. The geometrical array of plates 15 in their frame 16 corresponds to that of the optical systems 14 so as to maintain optical alignment for each channel.

It will be observed from the diagram in FIG. 2 that the large radial dimension "*d*" of the lens group causes steep obliquity of the image rays which enter the outermost lenses. The steepest angle of obliquity, as shown in FIG. 2, is the extreme ray 22 which crosses the alignment axis 24. In one successful form of the invention, the angle $\alpha$ is about 23 degrees which poses a difficult problem for the lens designer in achieving a sufficient depth of focus to cover the entire inclined field while meeting the further requirements of reducing coma and astigmatism to desirable minimum value in a lens system of $f/8.0$ numerical aperture without vignetting. All of these important criteria have been successfully achieved in the optical system comprising the present invention.

In electro-optical apparatus such as here discussed, it is necessary to use cylindrical lenses such as shown at 23 in FIG. 3 in certain optical systems on the lens board 21 for alignment purposes. Furthermore, some of the lens systems 14 at selected places in the lens group are equipped with partial diaphragms as shown at 24 in FIG. 3 to balance the relative light flux of the component lens systems. When such devices are added, the optical systems per se must be so perfectly designed that no degrading of the transmitted image will result from the use of such devices.

According to the present invention, the optical system 14 comprises front and rear single menicus lenses 25 and 26, respectively, these lenses being spaced on either side of a diaphragm 27 and having their concave sides facing each other. The front side of the lens system is the long conjugate side which lies toward the cathode ray tube 11. Air spaced outwardly therefrom are front and rear compound meniscus members numbered 28 and 29, respectively, these lenses being concave toward each other and being optically aligned with lenses 25 and 26 and diaphragm 27. The front compound member 28 is composed of a front biconvex lens which is designated by the letter A and this lens is cemented to a double concave lens which is designated by the letter B. Correspondingly, the rear lens member 29 is composed of a biconvex lens F which is cemented to a biconcave lens E as shown in FIG. 3. The compound members 28 and 29 each have negative power and the single members 25 and 26 have positive power proportionate thereto.

Of particular importance in designing a lens system which is well corrected for coma, zonal spherical aberration and astigmatism at finite conjugates is the distribution of power of the lens members such that the negative power of the rear compound member 29 is between 3.0 and 3.5 times the negative power of the front compound member 28. For the same reason, the focal length of the biconvex lens elements A and F are numerically set from 1.1 and 1.3 times the focal length of the biconcave elements B and E. By computation and experimentation, it has been found that the combined positive focal lengths of the single lenses C and D should have a numerical value between 10.0 and 12.0 percent of the combined negative focal lengths of the two compound lens members 28 and 29. Considerable improvement is effected by making the radius of curvature $R_1$ on the front surface of the front biconvex lens A substantially 20 percent less than the radius of curvature $R_{10}$ of the rear surface of the rear member 29, and by making the radius of curvature $R_2$ of the front interface between 102% and 105% of the radius of curvature $R_9$ of the rear interface.

Because of the strict requirement of sharp boundary imagery, the achromatization of the lens system as well as the correction for zonal spherical aberration, astigmatism and coma must be as perfect as possible and contributory to this effect, the Abbe number difference between the optical materials, used in the lens elements A and B or F and E in the front and rear compound members 28 and 29, respectively, should be between 8.0 and 12.0 wherein the higher Abbe number is related to the biconvex lens elements A and F.

Constructional data is given herebelow in the table shown in FIG. 4 with regard to one successful form of optical system 14 designed in conformity to the foregoing data, said system having an equivalent focus of 100 units consistent with the other units in the table. Said optical system has a numerical aperture of at least $f/8.0$ and a field angle of at least 50 degrees and the image is well achromatized for the use of ultraviolet radiation of substantially 4047 A. In FIG. 4, $R_1$ to $R_{10}$ designate radii of curvature of the refractive lens surfaces, numbering from the front or long conjugate side of the optical system, $t_1$ to $t_6$ designate the thicknesses of the lens elements A to F respectively, $S_1$ to $S_3$ designate the air spaces between certain lens elements, and $n_D$ and $\nu$ represent the refractive index and the Abbe number respectively of the lens materials.

[$f/8.0$ F.L.=100 50° field angle]

| Lens | Curvatures | Thickness | Spacing | $n_D$ | $\nu$ |
|---|---|---|---|---|---|
| | $R_1$ = +21.579 | | | | |
| A | | $t_1$=5.61 | | 1.6170 | 54.9 |
| | $R_2$ = −95.948 | | | | |
| B | | $t_2$=1.87 | | 1.5585 | 45.5 |
| | $R_3$ = +16.369 | | | | |
| | | | $S_1$=1.40 | | |
| | $R_4$ = +22.389 | | | | |
| C | | $t_3$=2.34 | | 1.5585 | 45.5 |
| | $R_5$ = +31.771 | | | | |
| | | | $S_2$=5.02 | | |
| | $R_6$ = −47.647 | | | | |
| D | | $t_4$=3.46 | | 1.5585 | 45.5 |
| | $R_7$ = −28.976 | | | | |
| | | | $S_3$=1.40 | | |
| | $R_8$ = −18.968 | | | | |
| E | | $t_5$=1.96 | | 1.5585 | 45.5 |
| | $R_9$ = +92.474 | | | | |
| F | | $t_6$=5.86 | | 1.6170 | 54.9 |
| | $R_{10}$ = −25.944 | | | | |

Using the optical data given in the table hereabove, the focal lengths of the front compound lens member 28 and the rear compound lens member 29 (see FIG. 3) are respectively −1719.38 and −530.18, the ratio therebetween being substantially 3.24. The individual focal lengths of the various lenses A, B, C, D, E and F are as follows:

| Lens: | Focal length |
|---|---|
| A | +28.21 |
| B | −23.96 |
| C | +119.72 |
| D | +119.35 |
| E | −26.96 |
| F | +32.46 |

It is submitted that there is here provided an optical system which is specially achromatized for the transmission of ultraviolet radiation and which transmits in that light band a very sharply defined and well corrected image of a minute object structure, said system possessing an unusually large depth of focus and freedom from coma, astigmatism and zontal spherical abberation, and being capable of projecting steeply oblique rays without vignetting while achieving a field of at least 50 degrees at $f/8.0$ numerical aperture.

Although but one form of my invention has been shown and described in detail, other forms are possible and changes may be made in the detailed arrangement and proportioning of the parts thereof without departing from the spirit of the invention as defined in the appended claim.

I claim:

An optical system for relaying information through an electro-optical switching apparatus by the use of ultraviolet radiation of substantially 4047 A., said system comprising two similar compound meniscus lenses which are arranged concave to each other, a pair of single meniscus lenses arranged with their concave sides directed toward a diaphragm situated therebetween and said pair of lenses being optically aligned between the two compound lenses, said system having constructional data as specified in the table herebelow wherein $R_1$ to $R_{10}$ designate the lens radii numbering from the front of the system, $t_1$ to $t_6$ designate the thicknesses of the lens elements, $S_1$ to $S_3$ designate the air spaces between certain of said elements, $n_D$ and $\nu$ represent the refractive index and the Abbe number respectively of the lens materials,

[$f/8.0$ F.L.=100 50° field angle]

| Lens | Curvatures | Thickness | Spacing | $n_D$ | $\nu$ |
|---|---|---|---|---|---|
| | $R_1=+21.579$ | | | | |
| A | | $t_1=5.61$ | | 1.6170 | 54.9 |
| | $R_2=-95.948$ | | | | |
| B | | $t_2=1.87$ | | 1.5585 | 45.5 |
| | $R_3=+16.369$ | | | | |
| | | | $S_1=1.40$ | | |
| | $R_4=+22.389$ | | | | |
| C | | $t_3=2.34$ | | 1.5585 | 45.55 |
| | $R_5=+31.771$ | | | | |
| | | | $S_2=5.02$ | | |
| | $R_6=-47.647$ | | | | |
| D | | $t_4=3.46$ | | 1.5585 | 45.5 |
| | $R_7=-28.976$ | | | | |
| | | | $S_3=1.40$ | | |
| | $R_8=-18.968$ | | | | |
| E | | $t_5=1.96$ | | 1.5585 | 45.5 |
| | $R_9=+92.474$ | | | | |
| F | | $t_6=5.86$ | | 1.6170 | 54.9 |
| | $R_{10}=-25.944$ | | | | |

References Cited in the file of this patent

UNITED STATES PATENTS 1,777,262 Hasselkus et al. ---------- Sept. 30, 1930
2,635,505 Schade ------------------ Apr. 21, 1953

FOREIGN PATENTS 847,600 France ------------------ July 3, 1939
592,144 Great Britain ------------ Sept. 9, 1947